(12) United States Patent
Shimazaki et al.

(10) Patent No.: US 6,317,339 B1
(45) Date of Patent: Nov. 13, 2001

(54) METHOD OF CONTROLLING ELECTRIC POWER SUPPLY APPARATUS WITH ELECTRIC POWER CONVERTER CIRCUIT

(75) Inventors: Mitsuyoshi Shimazaki; Masanori Nakagawa; Kaoru Shinba, all of Numazu (JP)

(73) Assignee: Kokusan Denki Co., Ltd., Shizouka-Ken (JP)

( * ) Notice: Subject to any disclaimer, the term of this patent is extended or adjusted under 35 U.S.C. 154(b) by 0 days.

(21) Appl. No.: 09/678,920

(22) Filed: Oct. 4, 2000

(30) Foreign Application Priority Data

Oct. 5, 1999 (JP) ............................................ 11-284277

(51) Int. Cl.⁷ .......................... H02M 5/458; H02H 7/122
(52) U.S. Cl. ................... 363/37; 363/56; 363/98
(58) Field of Search .............................. 363/34, 37, 39, 363/40, 78, 95, 98, 132, 56

(56) References Cited

U.S. PATENT DOCUMENTS 4,797,570    1/1989   Fox .

5,995,391 * 11/1999  Davies et al. .......................... 363/43
6,154,379 * 11/2000  Okita ...................................... 363/40

FOREIGN PATENT DOCUMENTS 4-190633    7/1992   (JP) .
5-15070     1/1993   (JP) .
5-328638   12/1993   (JP) .

* cited by examiner

*Primary Examiner*—Adolf Berhane
(74) *Attorney, Agent, or Firm*—Pearne & Gordon LLP

(57) ABSTRACT

A method of controlling an electric power supply apparatus with an electric converter circuit adapted to detect a phase difference between a waveform of a voltage across load connection terminals and a waveform of a reference voltage from time difference between zero cross points thereof and shift the phase of the reference voltage so that the phase difference is within a set range when it is decided that the phase difference is out of the set range whereby the phase of the output voltage across the load connection terminals is so controlled that it is coincident with that of an external voltage applied across the load connection terminals.

5 Claims, 6 Drawing Sheets

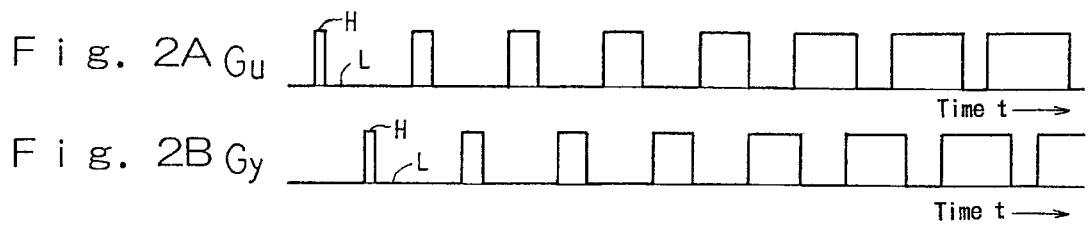
Fig. 2A $G_u$
Fig. 2B $G_y$
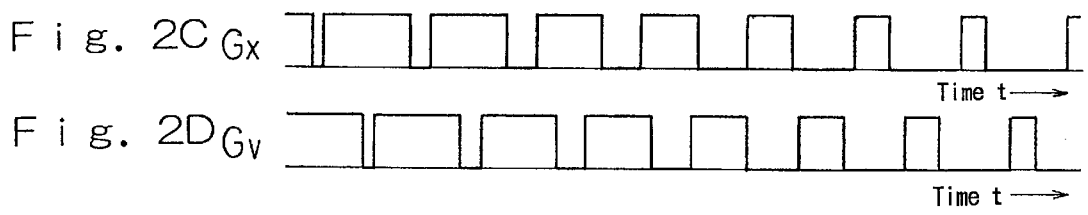
Fig. 2C $G_x$
Fig. 2D $G_v$
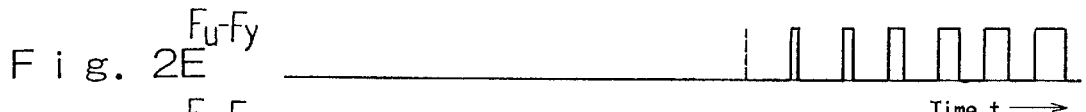
Fig. 2E $F_u\text{-}F_y$
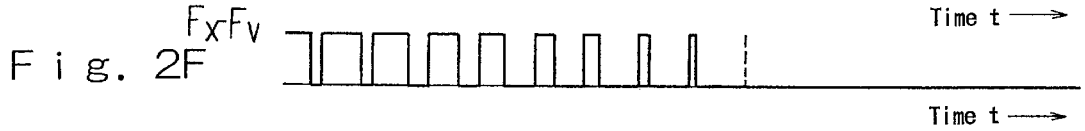
Fig. 2F $F_x\text{-}F_v$
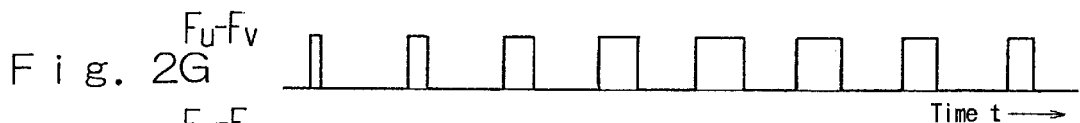
Fig. 2G $F_u\text{-}F_v$
Fig. 2H $F_x\text{-}F_y$

METHOD OF CONTROLLING ELECTRIC POWER SUPPLY APPARATUS WITH ELECTRIC POWER CONVERTER CIRCUIT

TECHNICAL FIELD OF THE INVENTION

This invention pertains to an electric power supply apparatus with an electric power converter circuit to convert an output of a DC power source or an AC power source into an AC output having a predetermined frequency and a method of controlling the same.

BACKGROUND OF THE INVENTION

There have been used various electric power supply apparatus provided with an electric power converter circuit such as an inverter, a cycloconverter or the like to convert an output from the electric power supply into an AC output of predetermined frequency. For example, as electric power source apparatuses comprising an AC generator driven by a primer such as an internal combustion engine, there have been used many electric power supplies adapted to convert an output from the AC generator into a DC voltage by rectifying the output and thereafter convert the DC voltage into an AC output having a predetermined peak value and a predetermined frequency by an inverter circuit.

Such an electric power supply apparatus comprises a rectifier to rectify the output from the AC generator, an inverter circuit including on-off controllable switch elements to convert an output from a rectifier power source portion into an AC output by a switching operation of the switch elements, a filter to remove a higher harmonic component out of the output from the inverter circuit, load connection terminals across which the output from the inverter circuit is applied through the filter, a load voltage detection circuit to detect a voltage across the load connection terminals and a controller to control the switch elements of the inverter circuit so as to obtain an voltage having a predetermined waveform across the load connection terminals.

There has been used for the inverter circuit a bridge type circuit having such a construction as a plurality of arms including upper switch elements and lower switch elements are connected in parallel to each other so as to form a bridge circuit.

The controller normally comprises a CPU (microcomputer) to control the switch elements of the inverter circuit to thereby turn them on or off at a predetermined period so as to output an AC voltage having a stepped waveform obtained by modulating a reference voltage with a pulse width modulation (PWM) system so as to simulate the waveform of the reference voltage.

What is meant by the reference voltage is such as a voltage as provides a reference waveform of an AC output that should be obtained across the load connection terminals (the output terminals of the electric power supply apparatus). This reference voltage is one having the waveform similar to that of the desired AC output.

The controller, for example, may comprise PWM (pulse width modulation) signal generation means to generate a PWM signal which in turn determines a duty value of the respective switch elements of the inverter circuit for obtaining from the inverter circuit the AC voltage of waveform provided by modulating the reference voltage with the PWM system by on-off controlling the switch elements of the inverter circuit with the predetermined duty value, PWM signal correction means to correct the PWM signal so as to have no deflection between a momentary value of the voltage detected by the load voltage detection circuit and a momentary value of the reference voltage, switch element drive means to apply a drive signal to the respective switch elements so as to on-off control the respective switch elements of the inverter circuit with the duty value determined by the PWM signal and overcurrent protection means to protect the switch elements by stopping the drive signal from being supplied to the inverter circuit when it is detected that the load current exceeds a set value.

The PWM signal normally includes a rectangular waveform signal having a repetition of a first state such as a high level state, for example and a second state such as a zero level state at a predetermined period. The PWM signal has the first and second states for the off-state period of the switch elements of the inverter circuit and for the on-state period thereof, respectively.

In the specification, the period of the PWM signal is called "PWM period" and the frequency of the PWM signal is called "PWM frequency". A ratio of time where the PWM signal has the first state relative to one period of the PWM signal is called the duty value of the PWM signal while a ratio of time occupied by the on-state time of the switch elements in the respective PWM period is called the duty value of the switch elements.

Furthermore, a time when the respective switch elements of the inverter circuit get the on-state or when the PWM period begins is called a switch time.

In case that the controller comprises the CPU, the respective PWM period can be detected by counting pulses generated at a predetermined period by a PWM period counting counter. The time when the respective PWM periods begin becomes the switch time when the switch elements get the on-state.

The duty value of the PWM signal generated at the respective switch times can be read out from a duty arithmetical operation map which is stored in a ROM to provide a relation of a series of switch times, an output voltage of the rectifier and the duty values of the PWM signal at the respective switch times or the duty values of the switch elements. Otherwise, it can be obtained by being arithmetically operated by using an arithmetical operation expression.

The CPU of the controller sets the on-time of the switch elements for the PWM signal generation timer on the duty value obtained by being read out from the map with an internal interruption of the operation which may be made at every PWM period "t" and provides a potential of the first state such as the high level state to an output port of the PWM signal while the on-time set by the timer continues to be counted whereby the PWM signal is generated.

The switch element drive means applies the drive signal (the signal for providing the on-state to the switch elements) to the corresponding switch element during the period of the first state of the PWM signal.

Supposed that the frequency (PWM frequency) of the PWM signal generated at the period "t" is referred to as "fp" and that the frequency of the output waveform is referred to as "fo" (period T), the internal interruptions will be made at times of n=fp/fo during the period T of one cycle of the output waveform.

FIG. 3 shows a relation between an internal interruption time (that is the switch time of the switch element) and the duty value of the PWM signal in case that the reference voltage is of sine waveform. In this figure, "a" designates a reference voltage waveform, "t" designates a PWM period, "VA" designates a peak value of the reference voltage, "Vav" designates an average value of the reference voltage and "T" designates a period or cycle of the reference voltage (a period or cycle of the desired AC voltage).

The duty value of the PWM signal varies for every time "t" as the momentary value of the reference voltage changes and thus the AC voltage of stepped waveform which is obtained by dividing the waveform of the reference voltage of one cycle into "n" waveform portions and which corresponds to the waveform obtained by modulating the reference voltage with the PWM system is output from the inverter circuit. As the AC voltage of the stepped waveform passes through the filter, the high harmonic component is removed out thereof and therefore, the output voltage of smooth sine waveform is obtained across the load connection terminals.

As the frequency of the PWM signal gets higher, the number of times of the interruption during one cycle of the AC voltage will increase. This enables the waveform of the reference voltage to be more finely simulated, which causes the waveform of the output voltage to be smoother. However, since the frequency of the PWM signal is required to be decided in consideration of the delay time such as the turn-on time or the turn-off time of the switch elements after the controller generates the signal till the switch elements are actually operated or the performance of the CPU such as the internal operation time thereof, the frequency of the PWM signal cannot get higher to an unlimited extent. Normally, the frequency of the PWM signal is set at about 10 KHz and constants of an inductance "L" (of coils) and a capacitance "C" (of capacitors) for the filter are decided in accordance with the frequency of the PWM signal.

In the electric power supply apparatus for generating the AC voltage with the inverter circuit used, there occurs a delay after the switch elements of the inverter circuits are turned on or off with the predetermined duty value until a voltage appears across the load connection terminals due to a delay of the on-operation and off-operation of the switch elements for the inverter circuit or a delay in the filter, which causes a phase difference to occur between the reference voltage and the voltage across the load connection terminals. FIGS. 4A and 4B show the relation of the phase between the waveform "a" of the reference voltage and the waveform "b" of the voltage across the load connection terminals. FIG. 4B shows a portion "B" of FIG. 4A in an enlarged scale. It will be noted from FIGS. 4A and 4B that the voltage across the load connection terminals is generated with a delay time of Δt relative to the reference voltage.

In the electric power supply apparatus using the inverter, whenever every internal interruption is made, the waveform of the voltage across the load connection terminals is converted by an A/D converter into a digital signal and read into the CPU. The momentary value of the thus read voltage across the load connection terminals makes an arithmetical feedback operation so that it is coincident with the momentary value of the reference voltage whereby the duty value of the PWM signal is corrected. In this case, since the CPU reads in the voltage across the load connection terminals with the time delay Δt relative to the reference voltage, the arithmetical feedback operation is made in consideration of the time delay Δt relative to the reference voltage so that the voltage across the load connection terminals is not distorted.

In the prior electric power supply apparatus, since the voltage across the load connection terminals is just controlled by turning on or off the switch elements of the inverter circuit with the timer provided in the CPU, the phase of the voltage across the load connection terminals cannot be coincident with that of an external voltage which will be applied across the load connection terminals due to the operation of the electric power supply apparatus in parallel to a separate electric power supply or due to disturbance.

Thus, when the external voltage is applied across the load connection terminals due to the operation of the electric power supply apparatus in parallel with the separate external electric power supply or due to the disturbance, there sometimes occurs a phase difference between the output voltage and the external application voltage, which provides a short circuit between the inverter circuit and the external electric power supply. This causes an overcurrent to flow through the switch elements of the inverter circuit, and at the worst breaks the switch elements.

SUMMARY OF THE INVENTION

Accordingly, it is a principal object of the invention to provide a method of controlling an electric power supply apparatus with an electric power converter circuit in which a phase of an output voltage across the load connection terminals can be speedily coincident with that of an external voltage which is applied across the load connection terminals with the phase different from that of the output voltage across the load connection terminals whereby the output voltage can not only be always supplied to the load in a stable manner, but also enables to be operated in parallel to the external electric power supply.

It is another object of the invention to provide a method of controlling an electric power supply apparatus with an electric power converter circuit in which a phase of an output voltage across the load connection terminals can be speedily coincident with that of an external voltage which is applied across the load connection terminals with the phase different from that of the output voltage across the load connection terminals whereby the output voltage can not only be always supplied to the load in a stable manner, but also enables to be operated in parallel to the external power source.

In accordance with one aspect of the present invention, there is provided a method of controlling an electric power supply apparatus with an electric power converter circuit for converting an output of an electric power supply into an AC output having a desired reference waveform by a on-off controllable switch elements being able to control the output of the electric power supply to supply the AC output to load connection terminals, the method comprising the steps of detecting a phase difference between an actual waveform of the AC output across the load connection terminals and the reference waveform thereof and shifting a phase of the reference waveform when the detected phase difference is out of a set range whereby the phase difference is within the set range so as to control the phase of the AC output.

With the control made in this manner, since the phase of the output voltage across the load connection terminals can be speedily coincident with that of an external voltage which is applied across the load connection terminals due to the operation of the electric power supply apparatus in parallel to a separate electric power supply or due to the disturbance even with the phase different from that of the output voltage across the load connection terminals, the output voltage can be always supplied to the load in a stable manner without any affect of the disturbance.

With the control made in the aforementioned manner, since the phase of the output voltage across the load connection terminals can be speedily coincident with that of the external application voltage, the electric power supply apparatus can be operated in parallel to a separate electric power supply without any complicated control.

In the electric power supply apparatus of the invention, in case that when an overcurrent exceeding a set value flows through the load connection terminals, the overcurrent is controlled so as to be interrupted, the control for interrupting the overcurrent is made inoperative during one or two cycles of the AC output when the phase difference between the waveform of the actual output across the load connection terminals and the reference waveform is out of the set range so that the overcurrent flows from the electric power converter circuit through the load connection terminals and the phase of the reference waveform is controlled so as to be shifted whereby the overcurrent which will flow even after the phase adjustment control is made is interrupted.

Normally, in the bridge type electric power converter circuit such as an inverter circuit or the like, a safety circuit to protect the switch elements of the converter circuit is provided for the respective switch elements. The safety circuit is adapted to protect the respective switch elements by compulsively turn off the switch elements by stopping supplying the drive signal to the switch elements when the current exceeding an allowable limit value or larger than the overcurrent to be interrupted in the overcurrent protection control flows through the switch elements. However, the switch elements will be never broken even though the overcurrent is allowed to flow during the period of one or two cycles.

A time difference between zero cross points of the reference waveform and the waveform of the output across the load connection terminals may be used for detecting the phase difference between them. In this case, the duty value of the switch elements for the electric power converter circuit is adjusted so that the time difference is within the set range when the phase adjustment control is made.

In accordance with another aspect of the invention, there is provided an electric power supply apparatus comprising an electric power converter circuit including on-off controllable switch elements to convert an output of an electric power supply into an AC output; a filter to remove a higher harmonic component out of the output of the electric power converter circuit; load connection terminals across which the output of the electric power converter circuit is applied through the filter; a load voltage detection circuit to detect a voltage across the load connection terminals and a controller to control the switch elements of the electric power converter so as to output an voltage having a waveform similar to that of a reference voltage between the load connection terminals, the controller including a phase difference decision circuit to detect a phase difference between the voltage detected by the load voltage detection circuit and decide whether the phase difference is out of a set range or not and phase difference control means to shift a phase of the reference voltage so that the phase difference is within the set range when it is decided by the phase difference decision means that the phase difference is out of the set range.

With the electric power supply apparatus constructed in the aforementioned manner, the output voltage can be always supplied to the load in a stable manner without any affect of the disturbance. Thus, it will be noted that the electric power supply apparatus can be operated in parallel to a separate electric power supply without any complicated control.

BRIEF DESCRIPTION OF THE DRAWINGS

The above and other objects and features of the invention will be apparent from the detailed description of the preferred embodiments of the invention, which is described and illustrated with reference to the accompanying drawings, in which;

FIGS. 2(A–H) are a time chart illustrative of an operation of the electric power supply apparatus of FIG. 1;

DETAILED DESCRIPTION OF PREFERRED EMBODIMENTS

Figure 1:
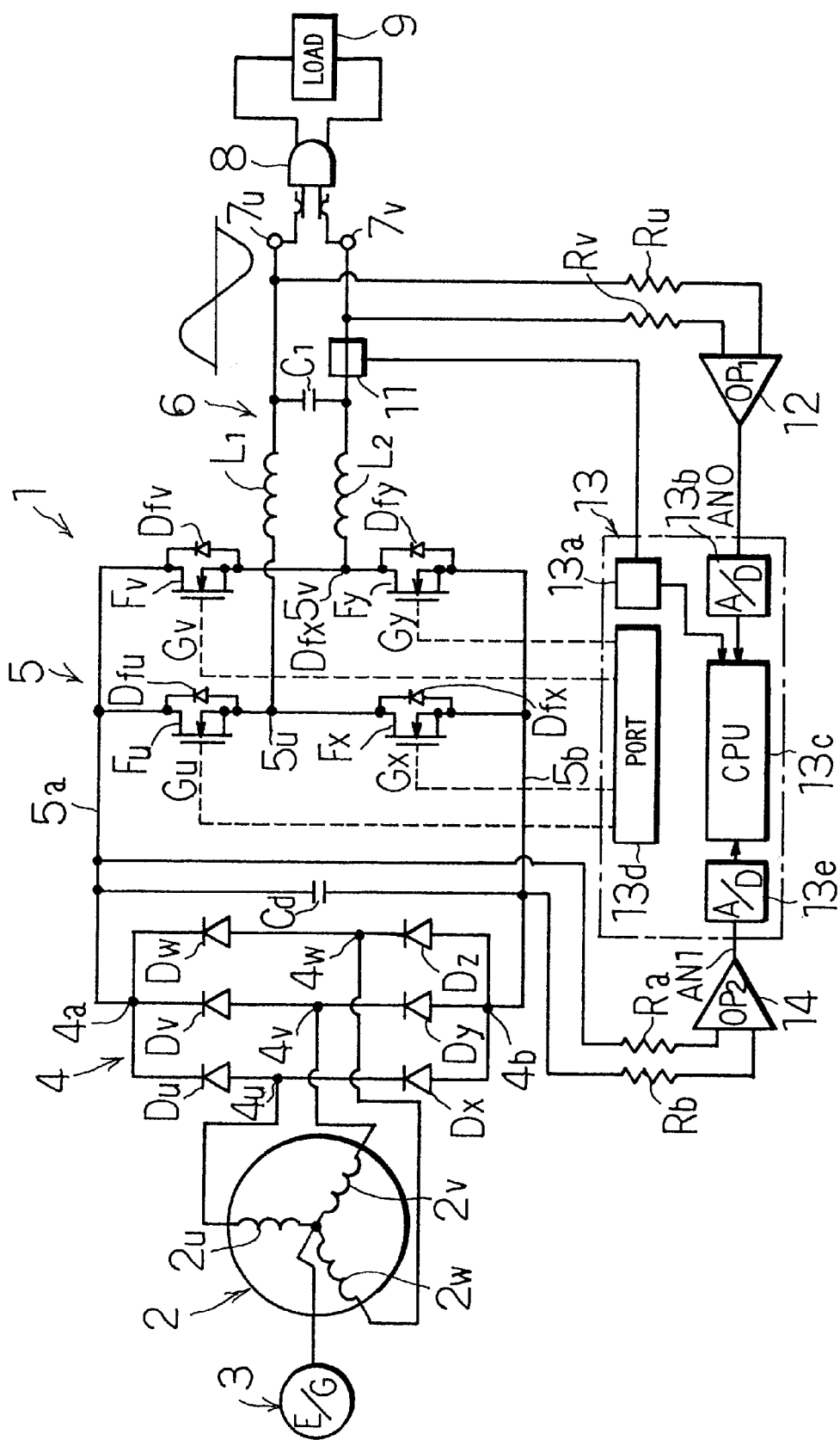
FIG. 1 is a schematic diagram of an electric power supply apparatus with an electric power converter circuit constructed in accordance with an embodiment of the invention.

Referring now to FIG. 1, there is shown an electric power supply apparatus constructed in accordance with one embodiment of the invention. The electric power supply apparatus comprises a three-phase magneto AC generator 2 and an internal combustion engine 3 to drive the magneto AC generator 2. The magneto AC generator 2 may comprise a multi-pole magnet rotor not shown and a stator having generation coils 2u through 2w connected in three-phase relation. The magnet rotor may be mounted on a crank shaft of the internal combustion engine 3.

A rectifier 4 may comprise diodes Du through Dw and Dx through Dz connected to each other in three-phase relation. Three phase output terminals of the generator 2 are connected to AC input terminal 4u through 4w of three phase AC input terminals of the rectifier 4 while a smoothing capacitor Cd is connected across the DC output terminals 4a and 4b of the rectifier 4.

A bridge type inverter circuit (an electric power converter circuit) 5 may have MOSFETs Fu and Fv, Fx and Fy used as switch elements. As noted from FIG. 1, in this inverter circuit, a first arm being formed of the MOSFETs Fu and Fx connected in series to each other and a second arm being formed of the MOSFETs Fv and Fy connected in series to each other are connected in parallel to each other to form an H bridge circuit.

Parasitic diodes Dfu, Dfv, Dfx and Dfy are connected between drains and sources of the MOSFETs Fu, Fv, Fx and Fy with anodes of the parasitic diodes faced to the sources of the MOSFETs, respectively. A pair of input terminals 5a and 5b of the inverter circuit 5 are connected to output terminals 4a and 4b of the rectifier 4, respectively while a pair of output terminals 5u and 5v of the inverter circuit 5 are connected to a pair of load connection terminals 7u and 7v, respectively through low pass filter circuit 6 having inductances L1 and L2 and a capacitance C1. A load 9 is connected to the load connection terminals 7u and 7v through a conventional connector 8 comprising a wall outlet and a plug in combination.

A load current detection circuit 11 serves to detect a current supplied from the inverter circuit 5 to the load 9 while a load voltage detection circuit 12 may comprise an operational amplifier OP1 and resistances Ru and Rv through which input terminals of the operational amplifier OP1 are connected to the pair of load connection terminals 7u and 7v, respectively. Outputs from the load current detection circuit 11 and the load voltage detection circuit 12 are input to a controller 13 to control the switch elements of the inverter circuit 5.

The controller 13 may be provided with a comparator 13a to compare the output from the load current detection circuit 11 with a reference signal, an A/D converter 13b to convert the output from the load voltage detection circuit 12 into a digital signal, a microcomputer 13c having a ROM not shown, a RAM also not shown and a CPU, a drive signal output circuit 13d to apply drive signals Gu, Gv, Gx and Gy to the gates of the FETs Fu, Fv, Fx and Fy, respectively in accordance with the PWM signal generated by the CPU and an A/D converter 13e to convert a detected value of the output voltage from the rectifier 4 into a digital signal.

The voltage across the output terminals of the rectifier 4 is applied to input terminals of an operational amplifier 14 through resistances Ra and Rb, respectively while an output from the operational amplifier 14 is input to the A/D converter 13e of the controller 13.

The controller 13 reads a data AN1 of the DC voltage obtained from the rectifier 4 through the operational amplifier 14 and the A/D converter 13e. The controller 13 also reads a momentary data AN0 indicating a momentary value of the voltage across the load connection terminals 7u and 7v.

The controller 13 outputs an AC voltage having the same waveform as that of the reference voltage from the load connection terminals by turning on and off the predetermined switch elements of the inverter circuit with the duty value determined on the output voltage AN1 from the rectifier 4 and the momentary value of the reference voltage at the switch time which comes at every PWM period "t".

Figure 5:
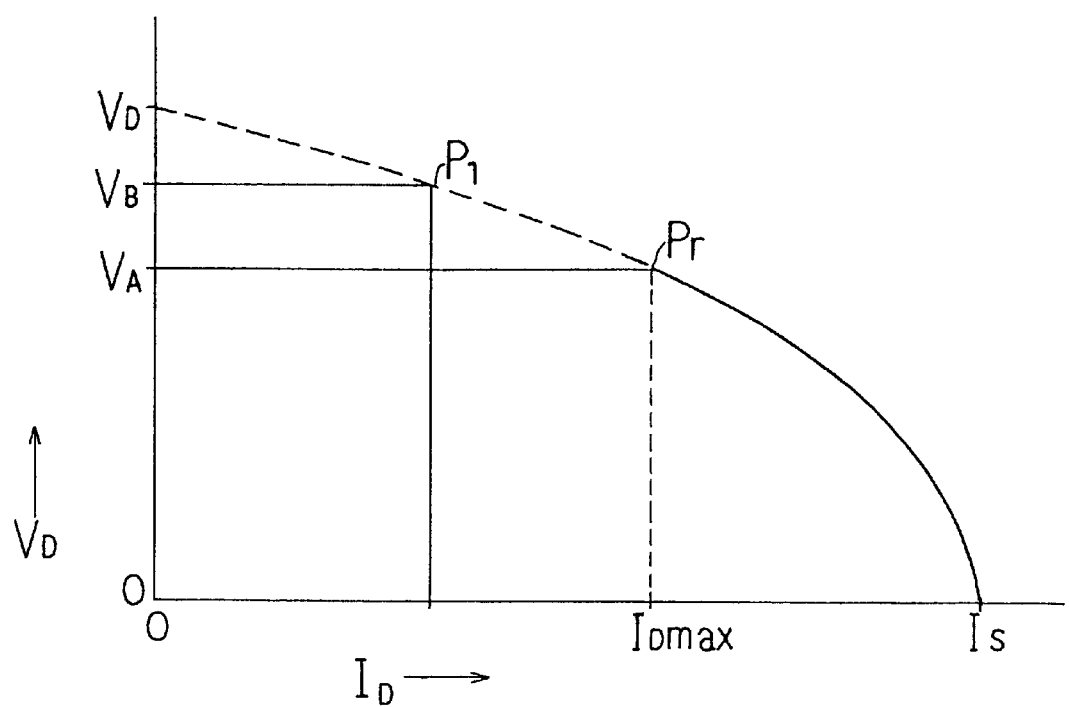
FIG. 5 illustrates one example of a characteristic of an output voltage to DC voltage of a rectifier in the electric power supply apparatus of FIG. 1.

The DC voltage "VD" output by the rectifier 4 varies relative to an output current "ID" in accordance with such a curve as indicated in FIG. 5, for example. Supposed that the peak value of the output voltage across the load connection terminals designates "VA" as indicated in FIG. 5, an operation point at the peak value will be at Pr and the maximum load current at the peak value will be "IDmax". Supposed that the actual operation point where the peak value of the output voltage is provided is "P1", the output voltage AN1 of the rectifier at the operation point will be "VB" and therefore a correction value "Kv" of the voltage will be given by the following expression;

$$Kv = VA/VB \qquad (1)$$

Figure 3:
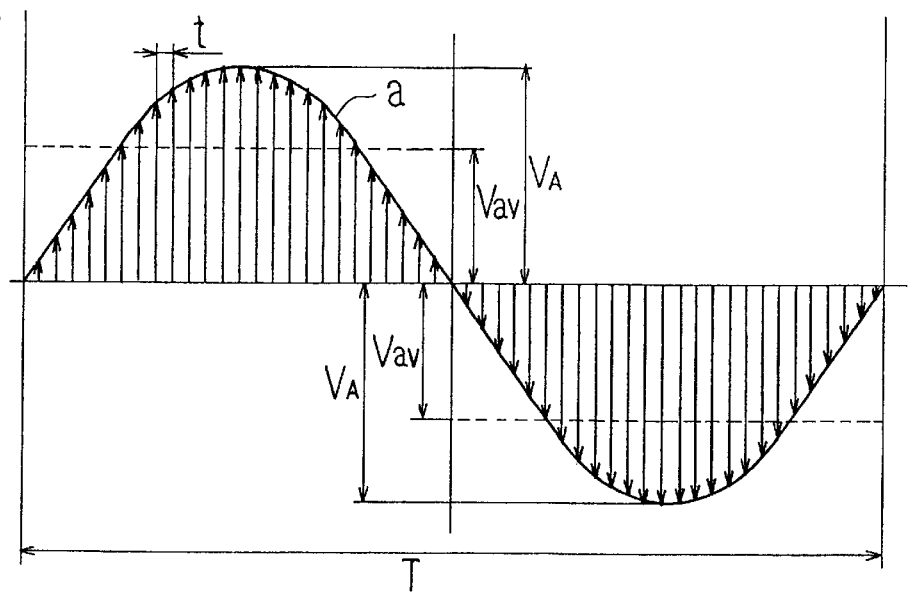
FIG. 3 illustrates a relation between an internal interruption time and a duty value of a PWM signal in case of a reference voltage of sine wave in the electric power supply apparatus applied by the invention.

With this correction value of the voltage used, the duty value D of the switch element at the respective PWM periods will be given by the following expression;

$$D[ = Sin(2\pi nt/T) \times Kv \qquad (2)$$

wherein "n" is a value indicating which of the PWM periods counted from the zero cross point of the rising up portion of the AC voltage waveform the present PWM period is and is given by a count value from a counter for counting the PWM period, "t" is the PWM period indicated in FIG. 3 and "T" is a time corresponding to one cycle of the output AC voltage.

The CPU can decide the duty value D by using the count value "n" of the counter, the voltage correction value "Kv" obtained by being arithmetically operated while using the data "AN1" of the read output voltage of the rectifier, a coefficient "Kc" obtained by being arithmetically operated from the voltage correction value "Kv" and the expression (2) or by being read from a duty arithmetical operation map stored in the ROM. The duty arithmetical operation map may be a three-dimensional map providing a relation of the count value "n" of the counter, the data "AN1" of the output voltage from the rectifier and the duty value D.

As aforementioned, the CPU may be provided with the counter for counting clock pulses to detect the switch time at every PWM period "t" from the count value "n" of the counter. Whenever the switch time is detected, the internal interruption is made to decide the duty value of the corresponding switch element at the respective switch times. The on-time of the switch element is set in a timer of the CPU based on the thus decided duty value. The PWM signal is at the high level state while the on-time set in the timer is counted and the PWM signal is at the zero level state when the timer ends the counting thereof.

The drive signal output circuit 13d serves to apply the drive signals to the switch elements of the inverter circuit in accordance with the PWM signals generated by the CPU.

The switch elements of the inverter circuit 5 shown in FIG. 1, which are the FETs Fu, Fv, Fx and Fy, in the illustrated embodiment, are on-off controlled in a switching pattern as shown in FIG. 2, for example. FIGS. 2A, 2B, 2C and 2D show drive signals Gu, Gy, Gx and Gv applied to the switch elements Fu, Fy, Fx and Fv in accordance with the PWM signals, respectively. The switch elements Fu, Fy, Fx and Fv are at the on-state when the drive signals Gu, Gy, Gx and Gv are at an "H" level while the switch elements Fu, Fy, Fx and Fv are held at the off-state when the drive signals Gu, Gy, Gx and Gv are at an "L" level.

FIGS. 2E and 2F show the times at which the switch elements (Fu and Fy) and (Fx and Fv) disposed at a diagonal position get turned on simultaneously. FIGS. 2G and 2H show the times at which the switch elements (Fu and Fv) forming the upper arm of the bridge circuit get turned on simultaneously and the times at which the switch elements (Fx and Fy) get turned on simultaneously, respectively.

Some users will possibly connect arbitrary load or loads between the load connection terminals. There may be capacitive loads, inductive loads or loads operated so as to intermittently pass a current through the load connection terminal among the loads possibly connected between the load connection terminals. Some loads tends to have the output waveform distorted and then have a larger distortion factor of the output voltage waveform even though they control the switch elements of the inverter circuit so as to obtain the AC voltage of reference waveform across the load connection terminals.

The electric power supply apparatus of FIG. 1 is so controlled as to reduce a deflection between the momentary value of the voltage detected by the load voltage detection circuit 12 and the momentary value of the reference voltage by reading the data AN0 providing the momentary value of the voltage across the load connection terminals in the CPU so as to be closer to zero and correcting the duty value of the PWM signals so that when the data AN0 is less than the reference data providing the momentary value of the reference voltage, the duty value of the PWM signal increases and when the data AN0 is larger than the reference data, the duty value of the PWM signals reduce.

The duty value D' obtained by the aforementioned correction is given by the following expression;

$$D'=D+G\times(ANS-AN0)\times Kc \quad (3)$$

wherein "ANS" is a reference data, which is the momentary value of the waveform of the reference voltage (reference waveform) at the respective switch times and "G" is a gain determining a ratio of correction relative to a difference between the reference data ANS and the data AN0. The gain "G" may be normally set at less than 1. The coefficient "Kc" is a value by which the correction value "G×(ANS−AN0)" of the momentary data of the voltage across the load connection terminals should be multiplied for converting it into the correction value for the duty value at that time and which is decided on "Kv".

The electric power supply apparatus of FIG. 1 may be provided with overcurrent protection means to control the overcurrent exceeding the set value flowing through the load connection terminals 7u and 7v to be interrupted by stopping the drive signals of the switch elements of the inverter circuit from being supplied.

In the electric power supply apparatus of FIG. 1, when there tends to occur the phase difference between the output voltage across the load connection terminals and the external voltage applied across the load connection terminals due to the operation of the apparatus in parallel to the external electric power supply or due to the disturbance, some short circuit will be produced between the inverter circuit and the external electric power source. This causes the overcurrent to flow through the switch elements of the inverter circuit and at the worst to possibly break the switch elements.

In accordance with the present invention, the momentary data AN0 of the voltage across the load connection terminals 7u and 7v are read out from the load voltage detection circuit 12, the phase difference delta t between the actual output waveform between the load connection terminals and the waveform of the reference voltage (reference waveform) is detected and when it is decided that the detected phase difference Δt is out of the set range, the duty value of the PWM signal is changed so that the phase of the reference voltage is shifted until the phase difference Δt relative to the reference voltage is within the allowable range.

When this phase control is made, the momentary data AN0 may be preferably read out in the routine of the internal interruption practiced in time with the period of the PWM signal that is at every switch time.

Figure 4A:
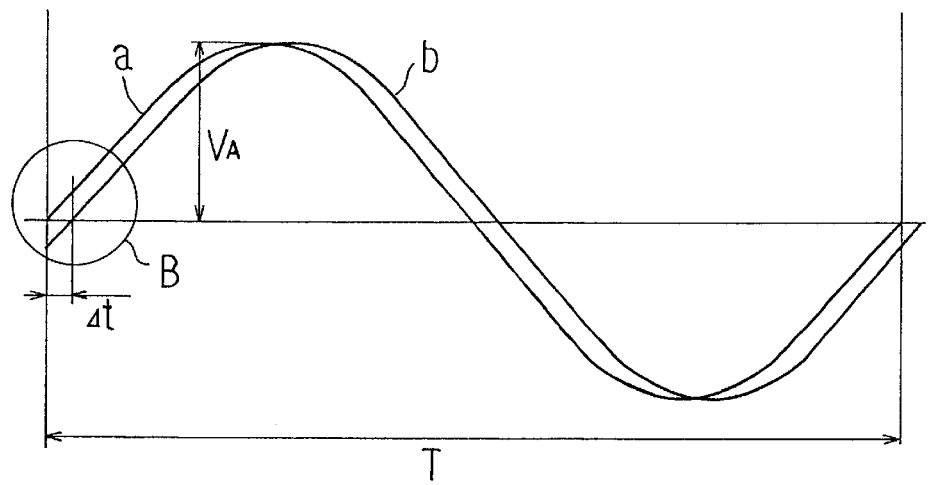
FIG. 4A illustrates a relation of a phase between the waveform of a reference voltage providing a reference waveform of the voltage output from the electric power supply apparatus applied by the invention and the voltage across the load connection terminals.
Figure 4B:
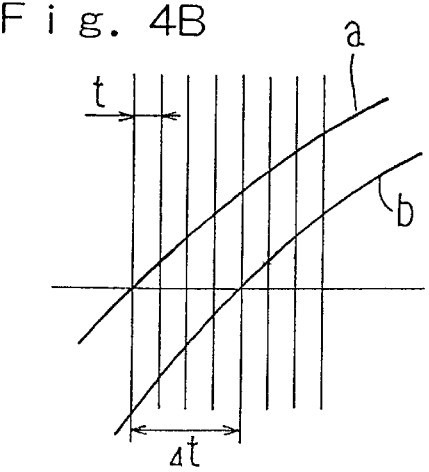
FIG. 4B illustrates a portion B of FIG. 4A in an enlarged scale.

In this phase control, the momentary data AN0 of the output voltage across the load connection terminals is taken in the RAM of the CPU in time with the PWM period and the phase difference Δt between the reference waveform determined from the output data of the PWM signal and the output voltage waveform determined from the momentary data AN0 corresponding to one period of the output voltage taken in the RAM is detected as shown in FIG. 4.

The phase difference Δt may be detected from the time difference between the time when the zero cross point of the output voltage waveform at its rising portion is provided and the time when the reference voltage at its rising portion is provided, which can be detected by the count value of the counter. Otherwise, the phase difference Δt may be detected from the time difference between the time when the zero cross point of the output voltage waveform at its falling portion is provided and the time when the reference voltage at its falling portion is provided Furthermore, the phase difference Δt may be detected from the time difference between the time when the output voltage reaches the maximum value and the time when the reference voltage reaches the maximum value or from the time difference between the time when the output voltage reaches the minimum value and the time when the reference voltage reaches the minimum value.

In the electric power supply apparatus of FIG. 1, there tends to occur a delay after the switch elements of the inverter circuit is turned on or off with the predetermined duty value so as to simulate the waveform of the reference voltage until the voltage appears across the load connection terminals 7u and 7v due to the delay of the on-operation or off-operation of the switch elements of the inverter circuit 5 or due to the delay in the filter circuit 6. Thus, there occurs the phase difference between the reference voltage and the voltage obtained across the load connection terminals 7u and 7v.

This causes the phase difference of certain range between the waveforms of the output voltage and the reference voltage in spite of the conditions of the load when the electric power supply apparatus is singly operated. In this case, the phase difference is defined within the allowable range even though the output voltage is distorted because the load is accompanied by the switching operation.

However, since the phase difference between the output voltage and the reference voltage largely varies when the external voltage is applied across the load connection terminals due to the disturbance or when the output from the external electric power supply is applied across the load connection terminals, the application of the external voltage across the load connection terminals due to the disturbance or due to the operation in parallel to the external electric power supply can be detected by monitoring whether the phase difference Δt is within the set range or not.

In the invention, the duty value of the PWM signal at every switch time is changed so that the phase difference Δt is defined within the set range or so that the phase of the reference voltage gets closer to that of the output voltage as soon as the application of the external voltage across the load connection terminals is judged from the phase difference Δt being out of the set range by always monitoring the phase difference Δt.

In case that the duty value of the PWM signal is so controlled that the phase difference Δt is within the set range, the phase of the reference voltage may be shifted so that the phase difference is speedily reduced or so that the phase difference is gradually reduced. In case that the gradual reduction of the phase difference may be accomplished by shifting the phase of the reference voltage at every time corresponding to one-second of the phase difference Δt, for example.

Figure 6:
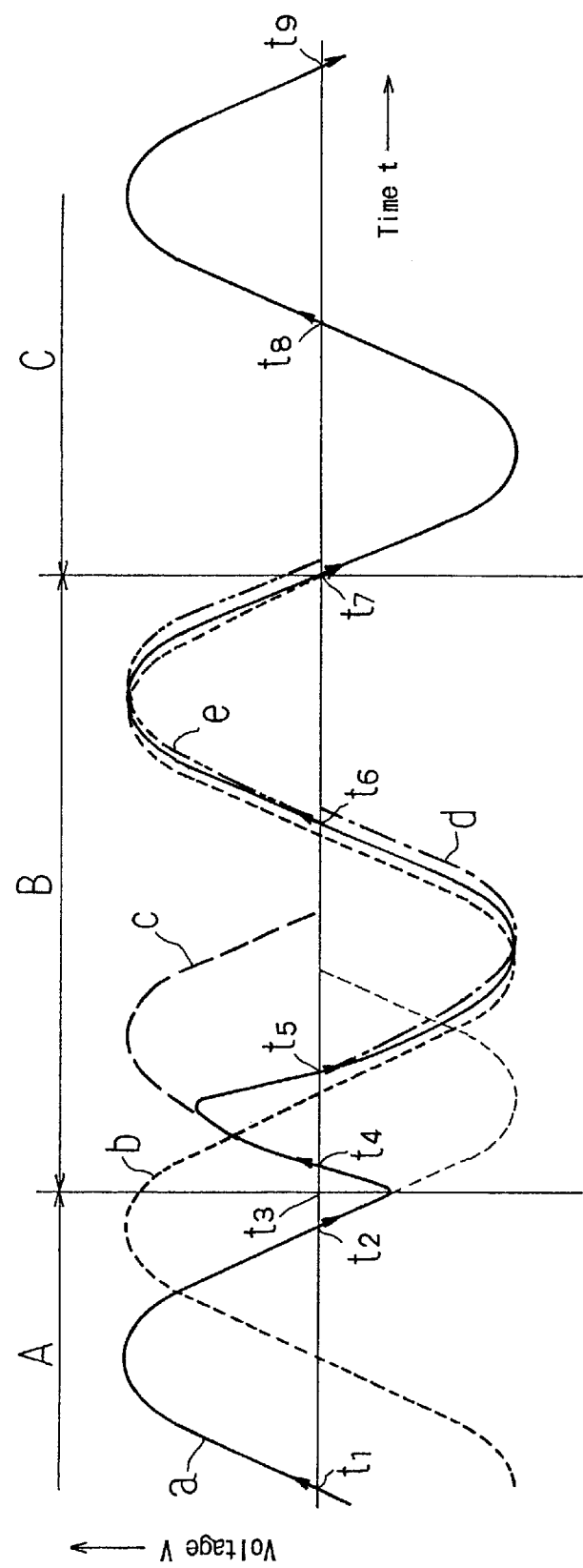
FIG. 6 illustrates one example of the control time for making the phase of the reference voltage with that of the voltage across the load connection terminals in the electric power supply apparatus of FIG. 1.

FIG. 6 shows an example of the control in which the phase of the reference voltage is so controlled that it is coincident with the phase of the voltage across the load connection terminals or so that the phase difference Δt between them is within the set range. In this example, a separate electric power supply apparatus that will be referred to as the separate apparatus is supposed to be connected across the load connection terminals 7u and 7v of the electric power supply apparatus of FIG. 1 that will be referred to as the self apparatus at the time t3 so that they are operated in parallel to each other.

The waveform "a" indicated by the solid line in a section "A" of FIG. 6 is one of the output voltage of the self apparatus produced between the load connection terminals based on the reference voltage while the waveform "b" indicated by a broken line is one of the output voltage of the separate apparatus.

Since the separate apparatus is not yet connected across the load connection terminals in the section "A", the output voltage of waveform "a" appears across the load connection terminals. A section "B" of FIG. 6 is a phase control section in which the phase of the reference voltage of the self apparatus is so controlled as to be coincident with the phase of the voltage across the load connection terminals which is the phase of the composite voltage of the output voltage of the self apparatus and the output voltage of the separate apparatus and a section "C" is one in which the phase difference between the reference voltage of the self apparatus and the voltage across the load connection terminals is within the set range so that the self apparatus can be operated in parallel to the separate apparatus in a normal manner. The waveforms indicated by the solid line in the sections "B" and "C" are ones of the voltage composed of the output voltages of the self apparatus and the separate apparatus.

In FIG. 6, the zero cross point "t1" of the output voltage at its rising portion in the section "A" is within the set range thereof. Also, the zero cross point "t2" of the output voltage at its falling portion is within the set range thereof.

As the separate apparatus is connected between the load connection terminals in parallel to the self apparatus at the time "t3", the output voltage of the self apparatus is pulled by the output voltage of the waveform "b" of the separate apparatus so that the output voltage across the load connection terminals reaches the rising zero cross point at the time t4 as shown in FIG. 6. Since this rising zero cross point is out of the set range, the. controller 13 changes the duty value of the PWM signal on the internal interruption so that the rising zero cross point of the output voltage of the self apparatus is defined within the set range to change the time set in the timer or the width of the drive signal. At that time, since the self apparatus outputs the voltage of the waveform "c" of FIG. 6 and the separate apparatus outputs the voltage of the waveform "b" thereof, the composite voltage reaches the falling zero cross point at the time t5. Since the zero cross point t5 is also out of the set range, the controller 13 changes the duty value of the PWM signal so that the falling zero cross point of the output voltage or reference voltage of the self apparatus is within the set range to control the phase of the output voltage.

Similarly, the phase of the output voltage of the self apparatus is controlled at the zero cross points at the times t6 and t7, respectively. In the section "C", since the phase of the output voltage of the self apparatus is nearly coincident with that of the separate apparatus, no short circuit is formed between the self apparatus and the separate apparatus. Thus, the parallel operation of the self apparatus and the separate apparatus is allowed.

In the electric power supply apparatus of FIG. 1, even though the inverter circuit is driven so as to obtain the output of given frequency, the phase of the output may be possibly shifted as time lapses due to the characteristics of the generator In the invention, since the phase difference between the output voltage and the reference voltage is always detected and the phase difference is so controlled as to be within the set range as soon as it is decided that the detected phase difference is out of the set range, the output that is always stable can be supplied to the load.

Although, in the example of FIG. 6, the separate electric power supply apparatus is supposed to be connected between the load connection terminals, the phase of the voltage across them can be coincident with the phase of the voltage given from the exterior within one cycle or two cycles of the output waveform so long as they are controlled by the phase control of the invention in spite of the phase relation between the voltage of the self apparatus and the external voltage or in spite of the time when the self apparatus and the separate apparatus begin to be operated in parallel to each other.

In case that two electric power supply apparatuses having the inverter circuit controlled with the same algorithm are operated in parallel to each other, they will have the voltage of waveform "c" generated at the rising zero cross point t4 of FIG. 6. Thus, it will be noted that with the inverter electric power supply apparatuses to which the invention is applied operated in parallel to each other, the phases of their output voltages can be coincident with each other immediately at the zero cross point t4.

In the example of FIG. 6, since, in the section "B", the phase of the output voltage of the self apparatus is not coincident with the phase of the output voltage of the separate apparatus, the short circuit will be formed between the self apparatus and the separate apparatus so that the overcurrent flows through the inverter circuit. The controller 13 serves to protect the switch elements of the inverter circuit 5 from the overcurrent by stopping the drive signals from being supplied to the switch elements when the overcurrent detection circuit 11 detects the overcurrent.

In case that the invention is applied, when the phase difference between the actual output voltage across the load connection terminals and the reference voltage is out of the set range and the overcurrent flows from the inverter circuit 5 through the load connection terminals 7u and 7v, the control of protection from the overcurrent gets inoperative and the phase of the reference waveform is shifted so that the phase difference is defined within the set range. When the overcurrent still flows even after the phase control, the control of protection from the overcurrent is made so as to avoid the switch elements from being broken by the overcurrent continuing to flow.

In case that the phase of the output voltage is still out of the set range in spite of the phase control, it is judged that the load connection terminals are shorted or the separate electric power supply of different frequency is connected and all the switch elements of the inverter circuit are turned off so as to stop the output of the self apparatus, which prevents the overcurrent from continuing to flow through the switch elements.

Figure 7:
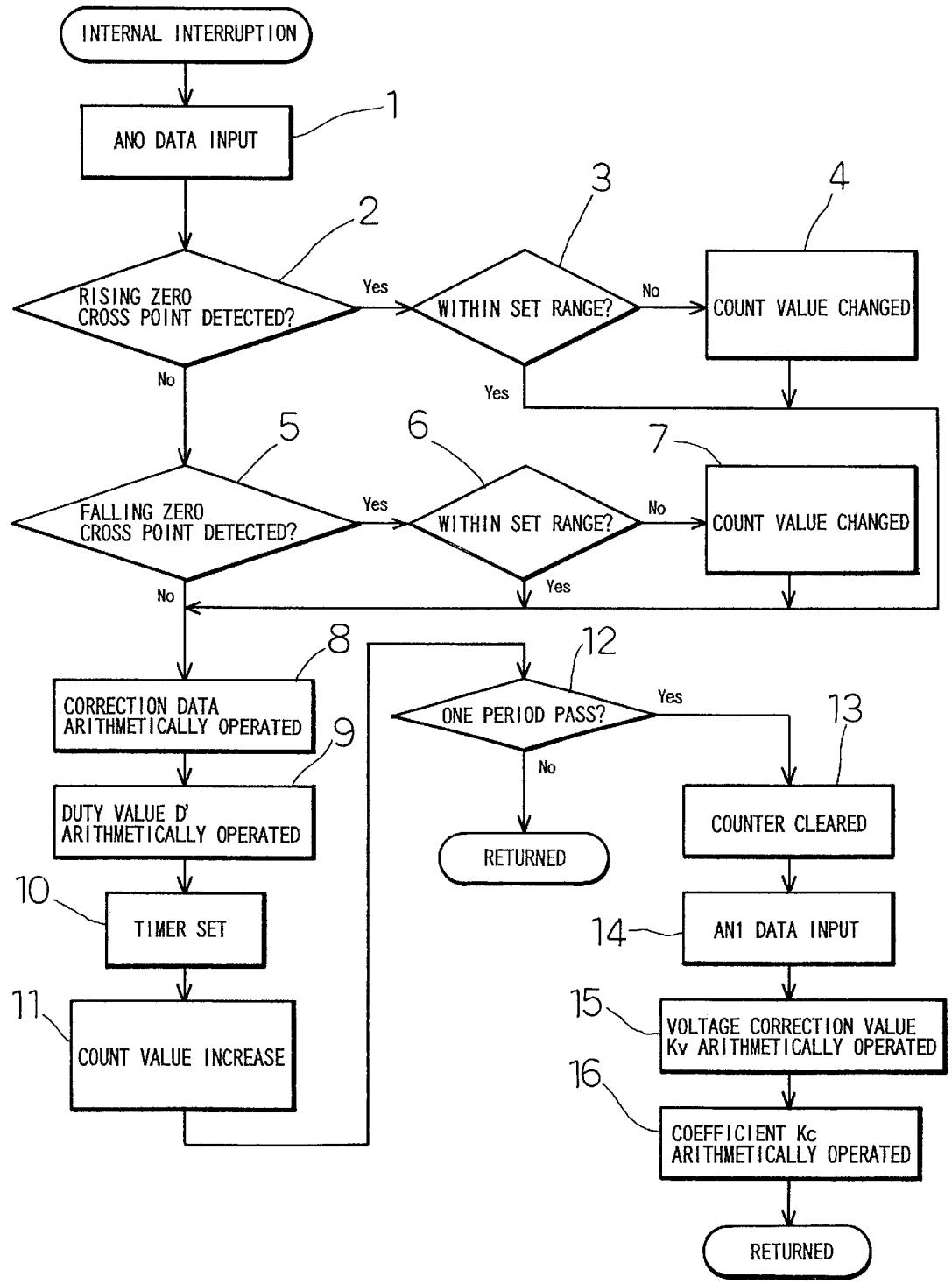
FIG. 7 illustrates a flowchart of one embodiment of an algorithm of a routine of an internal interruption process practiced by the CPU in case the invention is applied to the electric power supply apparatus of FIG. 1.

A flowchart of one example in which the CPU practices the algorithm of the routine of the internal interruption process when the control of the invention is made is shown in FIG. 7. The routine of the internal interruption process is practiced by the interval timer interruption using the timer provided in the CPU whenever the counter for counting the PWM period "t" (or switch time) counts pulses.

In the internal interruption process, at the step 1, the momentary data of the output voltage AN0 is read in and at the step 2, it is decided whether the time when the present interruption is made is at the rising zero cross point or not. This decision is made by comparing the now read in momentary data AN0 and the previously taken in momentary data AN0 to determine that the interruption time is at the rising zero cross point when the code of the momentary data AN0 is reversed from the negative to the positive. Thus, when it is decided that the present interruption time is at the rising zero cross point, the operation is forwarded to the step 3 where it is judged whether the decided zero cross point is within the normal range of the rising period (whether the phase between the rising zero cross point of the reference voltage and the rising zero cross point of the output voltage is within the set range). If it is decided that it is out of the set range, the operation is forwarded to the step 4 where the phase control is made so that the count value of the counter for the PWM period is changed to the value corresponding to the rising zero cross point at the present interruption time.

At the step 2, if it is decided that the present interruption time is not at the rising zero cross point, the operation is forwarded to the step 5 where it is decided whether the present interruption time is at the falling zero cross point or not. This decision is made by comparing the now read in momentary data AN0 and the previously taken in momentary data AN0 to determine that the interruption time is at the falling zero cross point when the code of the momentary data AN0 is reversed from the positive to the negative.

At the step 5, in case that the present interruption time is at the falling zero cross point, the operation is advanced to the step 6 where it is decided whether the falling zero cross point is within the set range or not (whether the phase difference between the falling zero cross point of the reference voltage and the falling zero cross point of the output voltage is within the set range). Thus, when it is decided that it is out of the set range, the operation is advanced to the step 7 where the phase control is made so that the count value of the counter for the PWM period is changed to the value corresponding to the falling zero cross point at the present interruption period.

When it is decided that, at the steps 3 and 6, the zero cross points are within the set range, that the steps 4 and 7 terminate, and that, at the step 5, the present interruption times are not at the falling zero cross points, the operation is advanced to the step 8 where the correction data "G× (ANS−AN0)×Kc" which corresponds to the second term of the expression (3) and is fed back from the momentary data AN0 is determined by the arithmetical operation. At the step 9, the duty value D' of the PWM signal from the CPU, which value is expressed by the expression (3) is arithmetically operated on the correction data.

Thereafter, at the step 10, the count value (the width of the PWM signal) is set in the timer for outputting the PWM signal and the signal is output from the CPU. The PWM signal is returned to the zero level when the PWM signal outputting timer completes counting the set time.

At the step 11, the count value of the PWM signal period counting timer increases and at the step 12, it is decided from the count value of the counter whether one period of the output voltage passes. Thus, when it is judged that one period of the output voltage does not yet pass, the operation is returned to the main routine and when it is judged that one period of the output voltage passes, the operation is advanced to the step 13 where the count value is cleared. Then, at the step 14, the detection data AN1 of the output from the rectifier 4 is taken in and the voltage correction value "Kv" is determined by arithmetically operating the expression (1). The data AN1 is detected just once per period of the output voltage waveform. After, at the step 15, the voltage correction value "Kv" is obtained by the arithmetical operation, at the step 16 the coefficient "Kc" is obtained by the arithmetical operation and thereafter, the operation is returned to the main routine.

In the aforementioned embodiment, by the steps 8 and 9 of the routine of the interruption process of FIG. 7 can be accomplished duty arithmetical operation means to arithmetically operate the duty value of the respective switch elements in a periodical manner at predetermined time intervals when the AC voltage across the load connection terminals having the waveform obtained by modulating the reference voltage with the PWM system so as to simulate the waveform of the reference voltage providing the predetermined waveform to the output voltage.

By the steps 8 through 10 of FIG. 7 can be accomplished duty correction means to correct the duty value obtained by the duty arithmetical operation means so that the deflection between the momentary value AN0 of the voltage detected by the load voltage detection means 12 and the momentary value of the reference voltage is within the allowable range.

By the steps 1, 2, 3, 5 and 6 of FIG. 7 can be accomplished phase difference decision means to decide whether the phase difference between the voltage detected by the load voltage detection circuit 12 and the reference voltage is within the set range or not.

Furthermore, by the steps 4 and 7 of FIG. 7 can be accomplished phase control means to shift the phase of the reference voltage so that the phase difference detected by the phase difference decision means is within the set range when it is detected that the phase difference is out of the set range.

In the aforementioned embodiment, although the electric power supply to apply the DC power to the inverter circuit comprises the generator and the rectifier, it may comprise a DC power supply such as a battery or a DC generator. The invention may be applied to such an electric power supply apparatus.

In the aforementioned embodiment, although the electric power converter circuit comprises the inverter circuit 5, it may comprise a cycloconverter or the like to convert the AC voltage of arbitrary frequency into the AC voltage of predetermined frequency. The invention may be applied to the electric power supply apparatus having such electric power converter circuits.

In accordance with the invention, since the phase of the reference voltage is shifted so that the phase difference between the actual output waveform of the voltage across the load connection terminals and the reference waveform of the reference voltage is within the set range when it is detected that the phase difference is out of the set range, the voltage across the load connection terminals can be immediately coincident with the phase of the external voltage which might be applied across the load connection terminals due to the operation in parallel to a separate electric power supply or due to disturbance and therefore, the stable voltage can be always supplied to the load.

Although one preferred embodiment of the invention has been described and illustrated with reference to the accompanying drawings, it will be understood by those skilled in the art that it is by way of example, and that various changes and modifications may be made without departing from the spirit and scope of the invention, which is defined only to the appended claims.

What is claimed is:

1. A method of controlling an electric power supply apparatus with an electric power converter circuit for converting an output of an electric power supply into an AC output having a predetermined reference waveform by on-off controllable switch elements being able to control said output of said electric power supply to supply said AC output to load connection terminals, comprising the steps of;

detecting a phase difference between an actual waveform of said AC output across said load connection terminals and said reference waveform thereof;

and shifting a phase of said reference waveform when the detected phase difference is out of a set range whereby said phase difference is within said set range so as to control the phase of said AC output.

2. A method of controlling an electric power supply apparatus with an electric power converter circuit for converting an output of an electric power supply into an AC output having a predetermined reference waveform by on-off controllable switch elements being able to control said output of said electric power supply to supply said AC output to load connection terminals and for interrupting an overcurrent exceeding a set value and flowing through said load connection terminals, comprising the steps of;

detecting a phase difference between an actual waveform of said AC output across said load connection terminals and said reference waveform thereof;

making inoperative the control for interrupting said overcurrent during one or two cycles of said AC output when it is detected that said overcurrent flows from said electric power converter circuit through said load connection terminals and that said phase difference is out of a set range and shifting a phase of said reference waveform so that said phase difference is within said set range so as to control the phase of said AC output;

and controlling said AC output so as to interrupt said overcurrent when said overcurrent continues to flow even after said phase control is made.

3. A method of controlling an electric power supply apparatus with an electric power converter circuit as set forth in claim 2, and wherein a time difference between zero cross points corresponding to said reference waveform and said actual waveform of said output across said load connection terminals is used for said phase difference and wherein a duty value of said switch elements for said electric power converter circuit is adjusted so that said time difference is within a set value when said phase control should be made.

4. A method of controlling an electric power supply apparatus with an electric power converter circuit as set forth in claim 1, and wherein a time difference between zero cross points corresponding to said reference waveform and said actual waveform of said output across said load connection terminals is used for said phase difference and wherein a duty value of said switch elements for said electric power converter circuit is adjusted so that said time difference is within a set value when said phase control should be made.

5. An electric power supply apparatus comprising an electric power converter circuit including on-off controllable switch elements to convert an output of an electric power source; a filter to remove a higher harmonic component out of said output of said electric power converter circuit; load connection terminals across which said output of said electric power converter circuit is applied through said filter; a load voltage detection circuit to detect a voltage across said load connection terminals and a controller to control said switch elements of said electric power converter so as to output an voltage having a waveform similar to that of a reference voltage to said load connection terminals, said controller including;

phase difference decision means to detect a phase difference between said voltage detected by said load voltage detection circuit and said reference voltage and to decide whether said phase difference is out of a set range or not;

and phase difference control means to shift a phase of said reference voltage so that said phase difference is within said set range when it is decided by said phase difference decision means that said phase difference is out of said set range.

* * * * *

UNITED STATES PATENT AND TRADEMARK OFFICE
CERTIFICATE OF CORRECTION

PATENT NO. : 6,317,339 B1
DATED : November 13, 2001
INVENTOR(S) : Shimazaki et al.

It is certified that error appears in the above-identified patent and that said Letters Patent is hereby corrected as shown below:

<u>Column 7,</u>
Line 64, delete "D[=Sin(2πn/T) x Kv" and insert -- D[=Sin(2πn/T) x Kv --.

<u>Column 15,</u>
Line 26, delete "claim 2" and insert -- claim 1 --.

Signed and Sealed this

Sixth Day of August, 2002

Attest:

JAMES E. ROGAN
Attesting Officer    *Director of the United States Patent and Trademark Office*

UNITED STATES PATENT AND TRADEMARK OFFICE
CERTIFICATE OF CORRECTION

PATENT NO.   : 6,317,339 B1
DATED        : November 13, 2001
INVENTOR(S)  : Shimazaki et al.

It is certified that error appears in the above-identified patent and that said Letters Patent is hereby corrected as shown below:

Column 7,
Line 64, delete "D[=Sin(2πn/T) x Kv" and insert -- D=Sin(2πn/T) x Kv --.

Column 15,
Line 26, delete "claim 2" and insert -- claim 1 --.

This certificate supersedes Certificate of Correction issued August 6, 2002.

Signed and Sealed this

Twenty-sixth Day of August, 2003

JAMES E. ROGAN
*Director of the United States Patent and Trademark Office*